(12) United States Patent
Komatsu et al.

(10) Patent No.: US 12,090,555 B2
(45) Date of Patent: Sep. 17, 2024

(54) ATOMIZER NOZZLE, ATOMIZING DEVICE, METHOD FOR PRODUCING METAL POWDER, AND METAL POWDER

(71) Applicants: MITSUBISHI HEAVY INDUSTRIES, LTD., Tokyo (JP); Mitsubishi Steel Mfg. Co., Ltd., Tokyo (JP)

(72) Inventors: Yoshinao Komatsu, Tokyo (JP); Masaya Hatanaka, Tokyo (JP)

(73) Assignees: MITSUBISHI HEAVY INDUSTRIES, LTD., Tokyo (JP); MITSUBISHI STEEL MFG. CO., LTD., Tokyo (JP)

( * ) Notice: Subject to any disclaimer, the term of this patent is extended or adjusted under 35 U.S.C. 154(b) by 628 days.

(21) Appl. No.: 17/238,889

(22) Filed: Apr. 23, 2021

(65) Prior Publication Data

US 2021/0237155 A1     Aug. 5, 2021

Related U.S. Application Data

(63) Continuation of application No. PCT/JP2019/041438, filed on Oct. 23, 2019.

(30) Foreign Application Priority Data

Oct. 25, 2018   (JP) ................. 2018-201273

(51) Int. Cl.
*B05B 1/34*     (2006.01)
*B01J 2/04*     (2006.01)
*B22F 9/08*     (2006.01)

(52) U.S. Cl.
CPC .............. *B22F 9/082* (2013.01); *B01J 2/04* (2013.01); *B22F 2009/088* (2013.01)

(58) Field of Classification Search
None
See application file for complete search history.

(56) References Cited

U.S. PATENT DOCUMENTS 4,756,452 A * 7/1988 Tsukamoto ............ B22D 41/58
                                           266/236
5,477,026 A * 12/1995 Buongiorno ......... B23K 26/144
                                           219/121.84
(Continued)

FOREIGN PATENT DOCUMENTS

EP      0 610 853            8/1994
GB      1250969 A    *     10/1971
(Continued)

OTHER PUBLICATIONS

International Search Report issued Dec. 24, 2019 in International (PCT) Application No. PCT/JP2019/041438, with English-language translation.

(Continued)

*Primary Examiner* — George Wyszomierski
(74) *Attorney, Agent, or Firm* — Wenderoth, Lind & Ponack, L.L.P.

(57) ABSTRACT

An atomizer nozzle includes: a molten metal nozzle extending in a vertical direction and which allows a molten metal to flow downward from a lower end thereof; and a gas nozzle including a chamber having an inner peripheral surface surrounding an outer periphery of the molten metal nozzle, a blow portion which introduces a gas to the chamber toward a circumferential direction of the molten metal nozzle, and a cover extending from the chamber to a position below the lower end of the molten metal nozzle while surrounding the molten metal nozzle, wherein the cover is provided with a tapered inner peripheral surface connected to the inner peripheral surface of the chamber and of which diameter is decreased as close to a lower end portion of the tapered inner peripheral surface.

9 Claims, 7 Drawing Sheets

(56) References Cited

U.S. PATENT DOCUMENTS

| | | | |
|---|---|---|---|
| 6,336,953 B1 * | 1/2002 | Kikukawa | B22F 9/082 75/331 |
| 2014/0202286 A1 | 7/2014 | Yokoyama et al. | |
| 2015/0201500 A1 | 7/2015 | Shinar et al. | |
| 2019/0270103 A1 | 9/2019 | Hanada et al. | |

FOREIGN PATENT DOCUMENTS

| | | |
|---|---|---|
| JP | 48-32761 | 5/1973 |
| JP | 6-22338 | 3/1994 |
| JP | 6-238211 | 8/1994 |
| JP | 2003-113406 | 4/2003 |
| JP | 2005-139471 | 6/2005 |
| JP | 2006-247619 | 9/2006 |
| WO | 2012/157733 | 11/2012 |
| WO | 2018/139544 | 8/2018 |

OTHER PUBLICATIONS

Written Opinion of the International Searching Authority issued Dec. 24, 2019 in International (PCT) Application No. PCT/JP2019/041438, with English-language translation.

* cited by examiner

ATOMIZER NOZZLE, ATOMIZING DEVICE, METHOD FOR PRODUCING METAL POWDER, AND METAL POWDER

The present application is a continuation claiming priority on the basis of Japanese Patent Application No. 2018-201273 filed in Japan on Oct. 25, 2018 and based on PCT/JP2019/041438 filed on Oct. 23, 2019. The contents of both the Japanese Patent Application and the PCT Application are incorporated herein by reference.

TECHNICAL FIELD

The present invention relates to an atomizer nozzle, an atomizing device, a method for producing a metal powder, and a metal powder.

BACKGROUND ART

In recent years, attention has been focused on the production of metal parts using 3D printers. In this type of producing method, a part having a desired shape can be obtained by laminating and welding a molten metal powder along a predetermined shape and then cooling and curing the molten metal powder. In order to produce parts having good shape and properties, high quality metal powder is essential.

As a technique for obtaining a metal powder, a method called a freefall method or a closed coupled method has been proposed so far. In these methods, an inert gas is injected from the periphery while a molten metal base material is allowed to flow downward by gravity. A shear force acts by the jet of a gas and the molten base metal is split and atomized. Then, classification is performed based on the particle size and a metal powder having a constant particle size can be obtained. As a specific example of such a technique, for example, a gas atomizer nozzle described in Patent Document 1 below is known.

The gas atomizer nozzle described in Patent Document 1 includes a molten metal nozzle which allows a molten metal base material to flow downward and a gas nozzle which surrounds the molten metal nozzle. The gas nozzle includes an annular gas supply chamber and a nozzle hole ejecting a gas from the gas supply chamber toward the periphery of the molten metal nozzle. A blow port introducing a gas into the gas supply chamber from a tangential direction is connected to the gas supply chamber. The nozzle hole is located above a discharge port of the molten metal nozzle.

Accordingly, a swirling component can be given to the gas ejected from the nozzle hole.

CITATION LIST

Patent Documents

Patent Document 1: Japanese Unexamined Patent Application. First Publication No. 2003-113406

Patent Document 2: Japanese Unexamined Patent Application. First Publication No. 2005-139471

Patent Document 3: PCT International Publication No. WO 2018/139544

Patent Document 4: PCT International Publication No. WO 2012/157733

Patent Document 5: Japanese Unexamined Utility Model Application. First Publication No. H6-22338

SUMMARY OF INVENTION

Technical Problem

However, in the device described in Patent Document 1, since the nozzle hole is disposed above the discharge port of the molten metal nozzle, the swirling flow component given to the gas may already diffuse and be lost when reaching the discharge port of the molten metal nozzle. As a result, there is concern that a sufficient shearing force cannot be applied to the molten metal and the obtained metal powder has a non-uniform particle size. Further, when the flow speed of the gas is increased to increase the shearing force, there is concern that the gas flows interfere with each other in the circumferential direction and the metal powder cannot be stably produced.

The present invention has been made to solve the above-described problems and an object of the present invention is to provide an atomizer nozzle capable of stably producing a metal powder having a more uniform particle size.

Solution to Problem

An atomizer nozzle according to an aspect of the present invention includes: a molten metal nozzle extending in a vertical direction and is configured to allow a molten metal to flow downward from a lower end of the molten metal nozzle; and a gas nozzle including a chamber having an inner peripheral surface surrounding an outer periphery of the molten metal nozzle, an introduction portion which is configured to introduce a gas to the chamber toward a circumferential direction of the molten metal nozzle, and a cover extending from the chamber to a position below the lower end of the molten metal nozzle while surrounding the molten metal nozzle, wherein the cover is provided with a tapered inner peripheral surface which is connected to the inner peripheral surface of the chamber and has a diameter which decreases toward a lower end portion of the inner peripheral surface.

A method for producing a metal powder according to another aspect of the present invention includes steps of: allowing a molten metal to flow downward from a lower end of a molten metal nozzle extending in a vertical direction; introducing a gas into a chamber having an inner peripheral surface surrounding an outer periphery of the molten metal nozzle from an introduction portion introducing a gas toward a circumferential direction of the molten metal nozzle; and applying a swirling flow to the gas introduced by a cover, extending from the chamber to a position below the lower end of the molten metal nozzle while surrounding the molten metal nozzle and provided with a tapered inner peripheral surface connected to the inner peripheral surface of the chamber and which has a diameter that decreases toward a lower end portion of the tapered inner peripheral surface, thereby the gas is brought into contact with the molten metal to atomize the molten metal.

According to the above-described configuration, the gas is introduced into the chamber through the introduction portion toward the circumferential direction of the molten metal nozzle. Accordingly, a swirling flow which swirls in the circumferential direction is formed in the chamber along the inner peripheral surface. Further, the inner peripheral surface of the chamber is connected to the tapered inner peripheral surface of the cover. Accordingly, the swirling flow flows downward along the tapered inner peripheral surface. Here, since the diameter of the tapered inner peripheral surface decreases toward a lower portion of the tapered inner peripheral surface, the angular velocity of the swirling flow increases toward the lower portion of the tapered inner peripheral surface. As a result, a large shearing force can be given to the molten metal flowing downward from the molten metal nozzle. In addition, since the cover extends to a position below the lower end of the molten metal nozzle, the swirling flow can be brought into contact with the molten metal before the swirling flow is diffused. On the other hand, when the cover stays above the lower end of the molten metal nozzle, the swirling flow ejected from the cover may already diffuse and be lost when reaching the discharge port of the molten metal nozzle. According to the above-described configuration, such a possibility can be reduced.

In the atomizer nozzle, the blow portion may be formed so as to introduce the gas obliquely downward to the chamber.

According to the above-described configuration, the gas is introduced obliquely downward into the chamber by the blow portion. That is, a flow component directed from above to below can be given to the gas. Accordingly, a larger shearing force can be given to the molten metal.

In the atomizer nozzle, the cover may be further provided with a diameter expansion surface which is connected to a lower end portion of the tapered inner peripheral surface and has a diameter which increases toward a lower end portion of the diameter expansion surface.

According to the above-described configuration, since the cover is further provided with the diameter expansion surface, the gas having reached the speed of sound when flowing along the tapered inner peripheral surface passes through the diameter expansion surface and becomes much faster. Accordingly, a larger shearing force can be applied to the molten metal. In addition, since the downward speed component also increases as the gas flow speeds up, the effect of blowing the metal powder downward is increased. Accordingly, it is possible to prevent the metal powder from adhering to the tapered inner peripheral surface or the diameter expansion surface. Thus, it is possible to reduce the possibility that the molten metal nozzle is blocked and improve the recovery rate of the produced metal powder.

In the atomizer nozzle, the cover may be further provided with a second diameter contraction portion which is installed below the tapered inner peripheral surface and has a diameter which decreases toward a lower end portion of second contraction portion, and an axial gas introduction portion which is configured to introduce a gas flow including a downward component to an inside of the second diameter contraction portion.

According to the above-described configuration, the gas flow including the downward component can be introduced into the second diameter contraction portion by the axial gas blow portion. Here, the gas flow including a swirling flow component having reached downward through the tapered inner peripheral surface tends to spread to the outer peripheral side due to the centrifugal force. However, in the above-described configuration, the gas flow including the swirling flow is suppressed from the outer peripheral side by the gas introduced from the axial gas blow portion. As a result, the angular velocity of the swirling flow is increased and the shearing force due to the gas can be further increased. Furthermore, since the downward speed component also increases as the gas flow speeds up, the effect of blowing the metal powder downward is increased. Accordingly, it is possible to prevent the metal powder from adhering to the tapered inner peripheral surface or the diameter expansion surface. Thus, it is possible to reduce the possibility that the molten metal nozzle is blocked and improve the recovery rate of the produced metal powder.

In the atomizer nozzle, an upper end portion of the second diameter contraction portion may have a larger radial dimension than that of the lower end portion of the tapered inner peripheral surface, and an opening as the axial gas blow portion may be formed between the upper end portion of the second diameter contraction portion and the lower end portion of the tapered inner peripheral surface.

According to the above-described configuration, since the opening is formed between the upper end portion of the second diameter contraction portion and the lower end portion of the tapered inner peripheral surface, a downward gas flow can be formed over the entire area in the circumferential direction. As a result, the gas flow including the swirling flow can be uniformly suppressed from the outer peripheral side by the gas introduced from the axial gas blow portion. Accordingly, a uniform shearing force is given to the molten metal in the circumferential direction and a metal powder can be stably produced.

In the atomizer nozzle, the chamber may be formed in an annular shape of which a central axis is aligned in the vertical direction.

According to the above-described configuration, since the chamber is formed in an annular shape, the swirling flow can be smoothly formed in the chamber. On the other hand, when the chamber has a rectangular or polygonal shape, the gas flow may be separated or stagnated at the corners, so that the swirling flow may not be stably formed. According to the above-described configuration, such a possibility can be reduced.

In the atomizer nozzle, the blow portion may be connected to the chamber so as to be extended in a tangential direction of the chamber.

According to the above-described configuration, since the blow portion is connected to the chamber so as to be extended in the tangential direction, the swirling speed (the circumferential speed) of the swirling flow formed in the chamber can be further increased. Accordingly, a sufficiently large shearing force can be given to the molten metal.

In the atomizer nozzle, the cover may include a plurality of the blow portions arranged at intervals in the circumferential direction.

According to the above-described configuration, since the cover includes the plurality of blow portions arranged at intervals in the circumferential direction, the distribution of the swirling speed (the circumferential speed) of the swirling flow formed in the chamber can be made uniform. Accordingly, a uniform shearing force can be given to the entire area of the molten metal in the circumferential direction.

An atomizing device according to an aspect of the present invention includes the atomizer nozzle according to any one of the above-described instances.

According to the above-described configuration, it is possible to obtain an atomizing device capable of stably producing a metal powder.

In the method for producing the metal powder, the molten metal may be stored in a molten metal storage portion and the metal powder producing method may further include detecting a height of a liquid level of the molten metal by a sensor and adjusting the pressure of a gas introduced from the blow portion in response to the detected height.

According to this method, when the flow rate of the molten metal decreases, the flow rate ratio (metal/gas ratio) of the gas and the molten metal can always be optimized by decreasing the pressure of the gas. That is, the flow rate of the gas can be adjusted in response to the flow rate of the molten metal. Accordingly, a metal powder can be more stably produced.

Advantageous Effects of Invention

According to the present invention, it is possible to provide an atomizer nozzle capable of stably producing metal powder having a more uniform particle size.

DESCRIPTION OF EMBODIMENTS

First Embodiment

Figure 1:
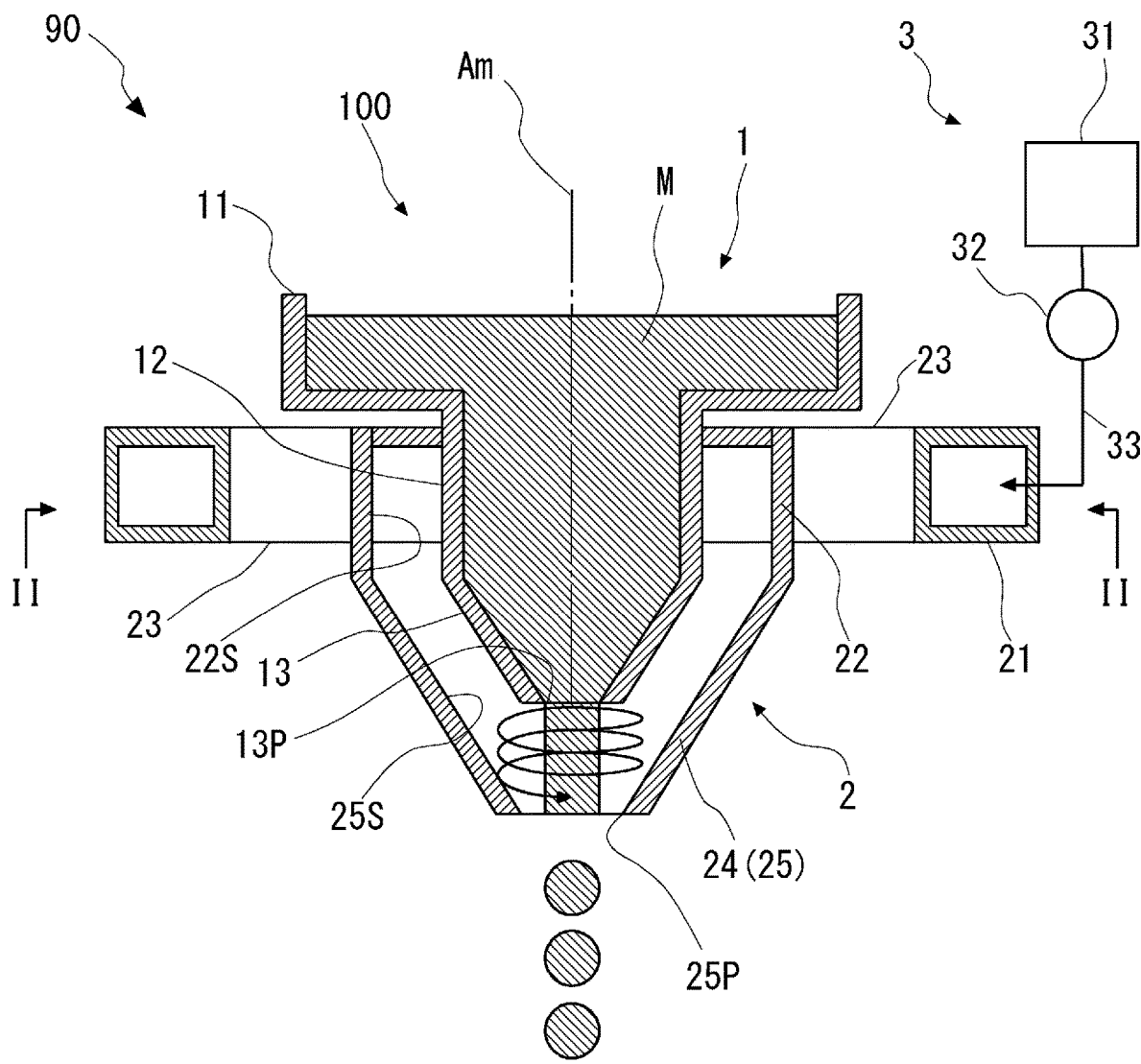
FIG. 1 is a vertical cross-sectional view of an atomizer nozzle according to a first embodiment of the present invention.

A first embodiment of the present invention will be described with reference to FIGS. 1 and 2. An atomizing device 90 according to this embodiment is, for example, a device for producing metal powder used for modeling parts by a 3D printer. As shown in FIG. 1, this atomizing device 90 includes an atomizer nozzle 100 and a gas supply unit 3. The atomizer nozzle 100 includes a molten metal nozzle 1 and a gas nozzle 2.

The molten metal nozzle 1 is provided to allow a molten metal base material (molten metal M) in a liquid phase state to flow downward by gravity. The molten metal nozzle 1 includes a molten metal storage portion 11, a cylindrical portion 12, and a tip portion 13. The molten metal storage portion 11 is a container for temporally storing the molten metal M. The molten metal storage portion 11 is formed in a bottomed cylindrical shape centered on an axis Am extending in the vertical direction.

The cylindrical portion 12 is connected to a bottom surface of the molten metal storage portion 11 and is formed in a cylindrical shape extending downward. The cylindrical portion 12 is formed in a cylindrical shape centered on the axis Am. A dimension of the cylindrical portion 12 in the radial direction with respect to the axis Am is constant over the entire area in the vertical direction. The cylindrical portion 12 is connected to a center position of the molten metal storage portion 11 (a position of the axis Am). That is, the cylindrical portion 12 and the molten metal storage portion 11 are coaxially provided. The radial dimension of the cylindrical portion 12 is smaller than the radial dimension of the molten metal storage portion 11.

The tip portion 13 is connected to a lower end portion of the cylindrical portion 12. The radial dimension of the tip portion 13 is gradually decreased from an upper end portion of the tip portion 13 toward the lower end portion. In other words, the diameter of the tip portion 13 gradually decreases toward the lower end portion of the tip end portion 13. A lower end portion of the tip portion 13 is formed as a molten metal discharge port 13P which opens downward. The molten metal discharge port 13P is formed in a circular shape centered on the axis Am. The molten metal M in a liquid phase state flows downward from the molten metal discharge port 13P. Additionally, the configuration of the molten metal nozzle 1 is not limited to the above-described one. For example, it is possible to adopt a configuration in which a through-hole is formed in the bottom surface of the molten metal storage portion 11 and the tip portion 13 is attached to communicate with this through-hole. That is, it is also possible to adopt a configuration in which the cylindrical portion 12 is not provided.

The gas nozzle 2 supplies a gas for splitting and atomizing the molten metal M by applying a shearing force to the molten metal M discharged from the molten metal discharge port 13P. The gas nozzle 2 includes an annular portion 21, a chamber 22, a blow portion 23, and a cover 24.

Figure 2:
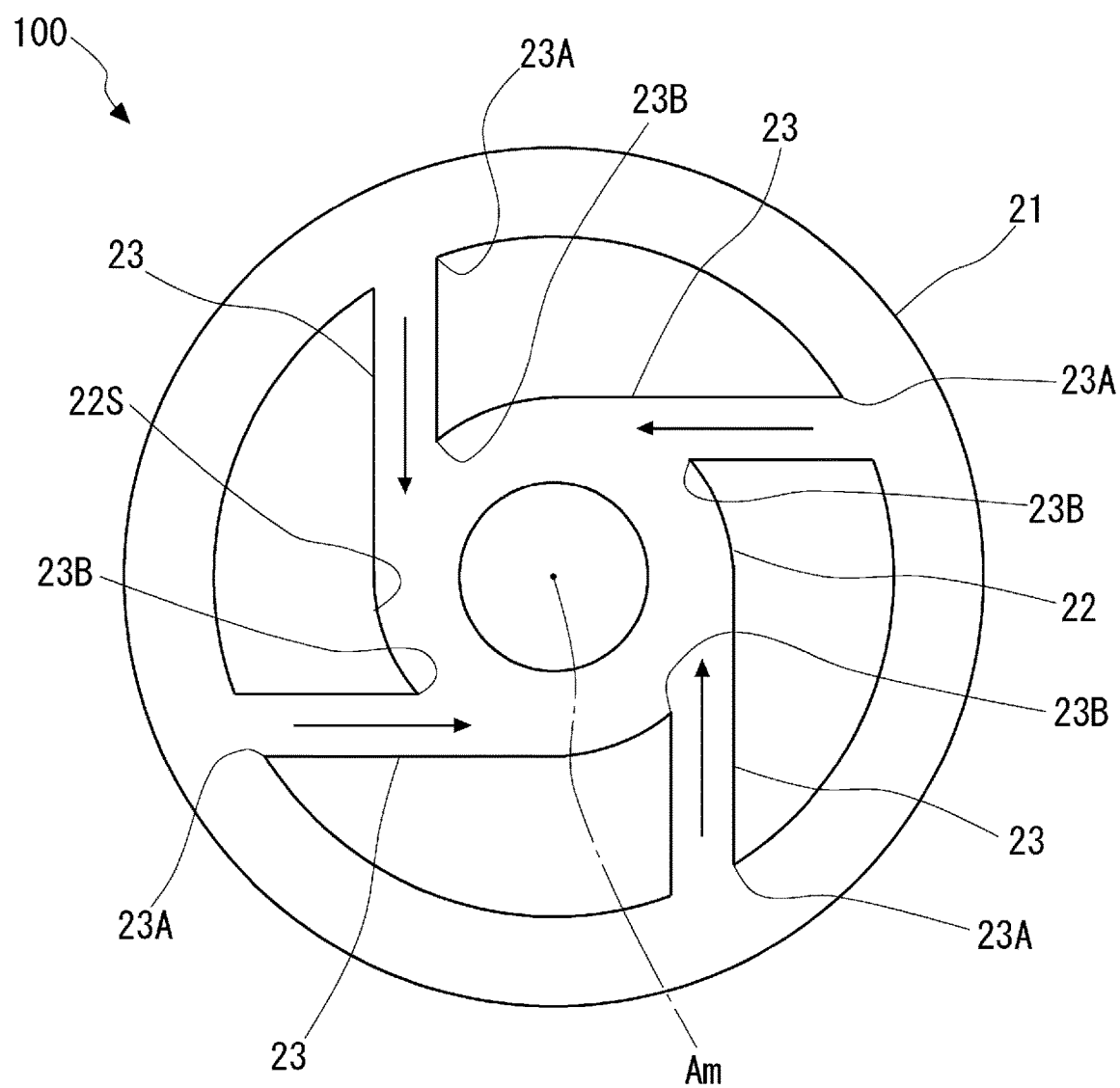
FIG. 2 is a cross-sectional view taken along a line 11-11 of FIG. 1.

As shown in FIG. 2, an annular portion 21 is formed in an annular shape centered on the axis Am and forms a space for a gas flow therein. A cross-sectional shape of the annular portion 21 in a plane including the axis Am is rectangular. Additionally, the cross-sectional shape of the annular portion 21 is not limited to a rectangular shape and may be a circular shape.

The chamber 22 is provided on the inner peripheral side of the annular portion 21 and is formed in an annular shape centered on the axis Am. A space for the flow of the gas introduced from the annular portion 21 through the blow portion 23 to be described later is formed in the chamber 22.

Figure 6:
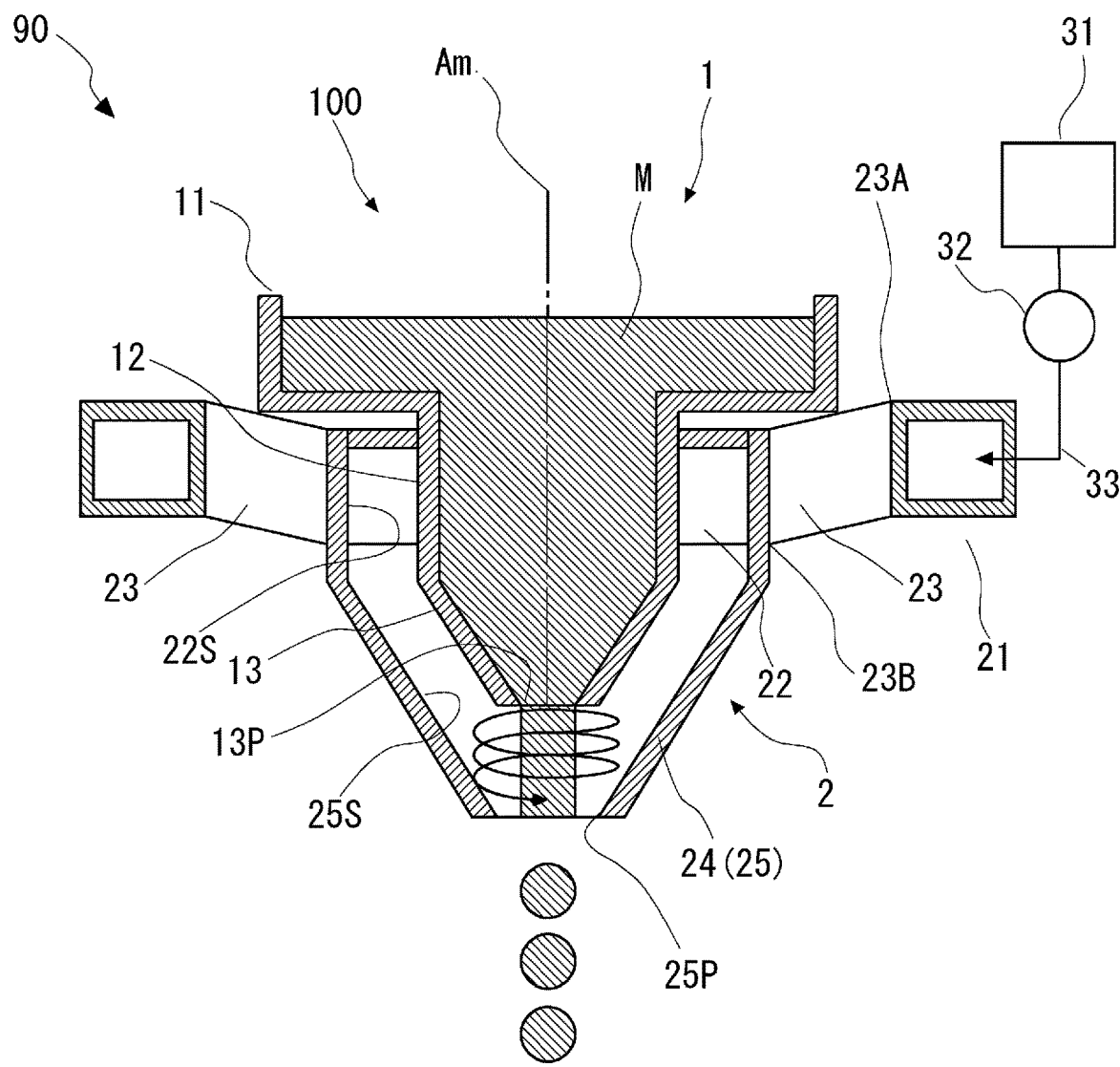
FIG. 6 is a schematic view showing a configuration of an atomizer nozzle according to a modified example of each embodiment of the present invention.

The blow portion 23 connects the annular portion 21 and the chamber 22. In this embodiment, the gas nozzle 2 includes a plurality of (four) blow portions 23 arranged at intervals (equal intervals) in the circumferential direction of the axis Am. Each blow portion 23 extends from the outer peripheral surface of the chamber 22 in the circular tangential direction formed by the chamber 22. Of both end portions of the blow portion 23, an end portion on the side of the annular portion 21 is formed as a first end portion 23A and an end portion on the side of the chamber 22 is formed as a second end portion 23B. The first end portion 23A opens to the inner peripheral surface of the annular portion 21. The second end portion 23B opens to the inner peripheral surface (the chamber inner peripheral surface 22S) of the chamber 22. Accordingly, the flow of the gas supplied front the annular portion 21 through the blow portion 23 flows in the circumferential direction in the chamber 22. Additionally, in the blow portion 23, the first end portion 23A and the second end portion 23B may be located in a horizontal plane (that is, a plane orthogonal to the axis Am), and the second end portion 23B may be located below the first end portion 23A as shown in FIG. 6. That is, the blow portion 23 extending from the first end portion 23A to the second end portion 23B may obliquely arranged from above downward. In the latter case, a component in the direction of the axis Am can be given to the gas flow. Further, even when the blow portion 23 itself extends in the horizontal plane, it is possible to adopt a configuration in which the gas is introduced from diagonally above to below into the chamber 22. Even in this case, the component in the direction of the axis Am can be given to the gas flow.

The cover 24 guides the gas flowing in the chamber 22 as described above toward the tip portion (the molten metal discharge port 13P) of the molten metal nozzle 1. As shown in FIG. 1, in this embodiment, the gas nozzle 2 includes a diameter contraction portion 25 which is the cover 24. The diameter contraction portion 25 extends downward from the chamber 22 with the axis Am as the center, and the diameter of the diameter contraction portion 25 decreases toward the lower end portion of the diameter contraction portion 25. The diameter contraction portion 25 extends from the lower end portion of the chamber 22 to the lower side of the lower end portion (the molten metal discharge port 13P) of the molten metal nozzle 1 while surrounding the molten metal nozzle 1. An inner peripheral surface of the diameter contraction portion 25 is formed as a tapered inner peripheral surface 25S having a diameter which decreases toward a lower end portion of the tapered inner surface 25S. The radial dimension decrease rate of the tapered inner peripheral surface 25S is a monotonous change over the entire area in the direction of the axis Am. That is, a lower section of the tapered inner peripheral surface 25S anywhere has less radial dimension than an upper section thereof.

A lower end portion of the cover 24 is formed as a gas discharge port 25P which discharges the gas. The position of the gas discharge port 25P in the vertical direction (the direction of the axis Am) is lower than the molten metal discharge port 13P of the molten metal nozzle 1. The gas discharge port 25P is formed in a circular shape centered on the axis Am. The radial dimension (the opening diameter) of the gas discharge port 25P is larger than the radial dimension (the opening diameter) of the molten metal discharge port 13P. The gas discharge port 25P and the molten metal discharge port 13P are arranged coaxially with each other about the axis Am.

Additionally, when the diameter of the gas discharge port 25P is D, a gap H in the vertical direction between the gas discharge port 25P and the molten metal discharge port 13P (a gap on the axis Am) is preferably set to a dimension of 1D<H<2D. Here, the gas diffuses outward in the radial direction due to the swirling flow in the gas discharge port 25P. As described above, when the gap H is set to be larger than 1D, it is possible to suppress the propagation of this effect to the flow in the cover 24. As a result, a larger fluid force can be given to the molten metal M.

The gas supply unit 3 includes a gas supply source 31, a compressor 32 which is a gas pressure-feeding unit, and a supply pipe 33. The gas supply source 31 is, for example, a container for storing an inert gas such as argon or neon. The gas supply source 31 is connected to the annular portion 21 by the supply pipe 33. The compressor 32 for pressure-feeding a gas is provided on the supply pipe 33. That is, when the compressor 32 is driven, the gas is introduced from the gas supply source 31 toward the annular portion 21. The component or composition of the gas are not limited to the above-described argon and neon and any gas can be used as the gas as long as a chemical reaction does not occur with the molten metal M (metal base material). Further, instead of the compressor 32 described above, a high-pressure cylinder or a high-pressure tank filled with a gas can be used as the gas pressure-feeding unit.

Figure 7:
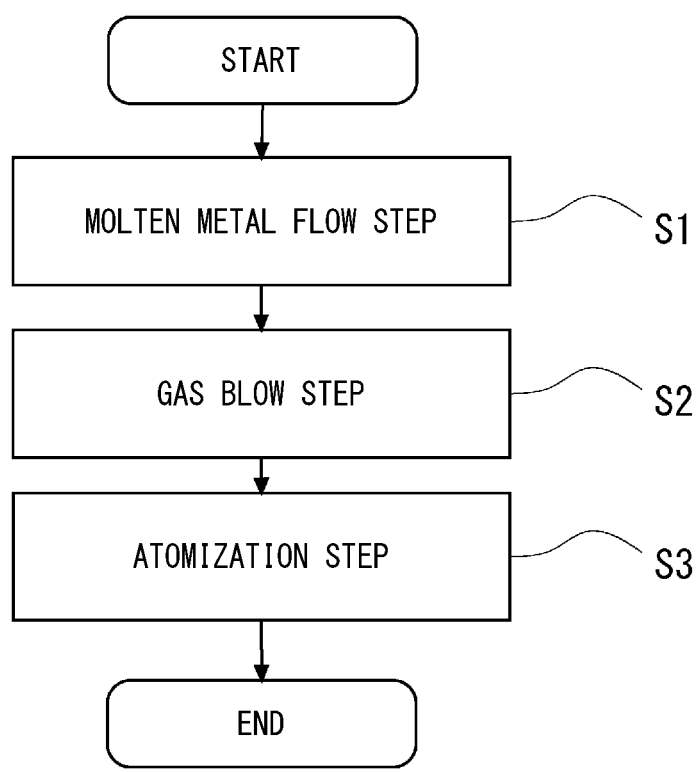
FIG. 7 is a flowchart showing steps of a method for producing a metal powder according to an embodiment of the present invention.

Next, a metal powder producing method according to this embodiment will be described with reference to FIG. 7. As shown in the same drawing, this method includes a molten metal flow step S1, a gas blow step S2, and an atomization step S3. In the molten metal flow step S1, the molten metal M in the liquid phase state is allowed to flow downward from the molten metal nozzle 1. Next, in the gas blow step S2, the gas is introduced into the chamber 22 in the circumferential direction of the molten metal nozzle 1 by the blow portion 23. Then, in the atomization step S3, the molten metal M is atomized by the shearing force of the gas to obtain a metal powder. As described above, all steps of the method for producing the metal powder according to this embodiment are completed.

Next, an operation of the atomizer nozzle 100 according to this embodiment will be described. When operating the atomizer nozzle 100, the compressor 32 is first driven to supply a gas into the annular portion 21 of the gas nozzle 2. At the same time, the molten metal storage portion 11 of the molten metal nozzle 1 is filled with the molten metal M. When the annular portion 21 is filled with a gas, that is, when the pressure of the gas in the annular portion 21 increases, the gas flows toward the blow portion 23 due to the corresponding pressure. The gas having passed through the blow portion 23 is guided into the chamber 22. Here, since the blow portion 23 extends in the circular tangential direction formed by the chamber 22 as described above, the gas guided from the blow portion 23 into the chamber 22 swirls in the chamber 22 from one side to the other side of the circumferential direction about the axis Am. The swirling flow formed in the chamber 22 reaches the cover 24 (the diameter contraction portion 25) connected to the lower side of the chamber 22 while maintaining the swirling speed (angular velocity).

Here, the inner peripheral surface of the cover 24 is formed as the tapered inner peripheral surface 25S having a diameter which decreases toward a lower end portion of the tapered inner peripheral surface 25S. Accordingly, the swirling flow of the gas guided from the chamber 22 flows downward while swirling along the tapered inner peripheral surface 25S. At this time, since the tapered inner peripheral surface 25S decreases in diameter, the angular velocity of the swirling flow gradually increases as it goes downward. Then, the gas reaching the molten metal discharge port 13P of the molten metal nozzle 1 contacts the molten metal M flowing down from the molten metal discharge port 13P so that a shearing force is given to the molten metal M. Due to this shearing force, the molten metal M is split and atomized. The fine particles of the molten metal M are cooled and hardened as they move downward to become a metal powder. The metal powder produced in this way is recovered by a recovery device (not shown) and classified according to the particle size. Accordingly, a metal powder having a desired particle size can be obtained.

According to the above-described configuration, the gas is introduced into the chamber 22 through the introduction portion 23 in the circumferential direction of the molten metal nozzle 1. Accordingly, a swirling flow which swirls in the circumferential direction is formed along the inner peripheral surface in the chamber 22. Further, the inner peripheral surface of the chamber 22 is connected to the tapered inner peripheral surface 25S of the cover 24. Accordingly, the swirling flow flows downward along the tapered inner peripheral surface 25S. Here, since the diameter of the tapered inner peripheral surface 25S decreases toward the lower end portion of the tapered inner peripheral surface 25S, the angular velocity of the swirling flow increases downward. As a result, a large shearing force can be given to the molten metal M flowing down from the molten metal nozzle 1. In addition, since the cover 24 extends to a position below the lower end of the molten metal nozzle 1, the swirling flow can be brought into contact with the molten metal M before the swirling flow is diffused. On the other hand, when the cover 24 stays above the lower end of the molten metal nozzle 1, the swirling flow ejected from the cover 24 may already diffuse and be lost when reaching the discharge port of the molten metal nozzle 1. However, according to the above-described configuration, such a possibility can be reduced. As a result, it is possible to stably produce a metal powder having a more uniform particle size.

Further, according to the above-described configuration, since the chamber 22 is formed in an annular shape centered on the axis Am, the swirling flow can be smoothly formed in the chamber 22. On the other hand, when the chamber 22 has a rectangular or polygonal shape, the gas flow may be separated or stagnated at the corners, so that the swirling flow may not be stably formed. According to the above-described configuration, such a possibility can be reduced.

Additionally, according to the above-described configuration, since the blow portion 23 is connected to the chamber 22 from the tangential direction, it is possible to further increase the swirling speed (the circumferential speed) of the swirling flow formed in the chamber 22. Accordingly, a sufficient large shearing force can be given to the molten metal M.

Furthermore, according to the above-described configuration, since the cover 24 includes the plurality of blow portions 23 arranged at intervals in the circumferential direction, the distribution of the swirling speed (circumferential speed) of the swirling flow formed in the chamber 22 can be made uniform. Accordingly, a uniform shearing force can be given to the entire area in the circumferential direction of the molten metal M.

The first embodiment of the present invention has been described above. Additionally, various changes and modifications can be made to the above configuration as long as the gist of the present invention is not deviated. For example, in the first embodiment, an example in which four blow portions 23 are provided has been described. However, the number of the blow portions 23 is not limited to four, but may be three or less or five or more.

Additionally, in the first embodiment, an example in which the plurality of blow portions 23 are arranged at intervals in the circumferential direction has been described. However, the configuration of the blow portion 23 is not limited the above-described one and the plurality of blow portions 23 may be continuously arranged over the entire area in the circumferential direction to be adjacent to each other in the circumferential direction.

Second Embodiment

Figure 3:
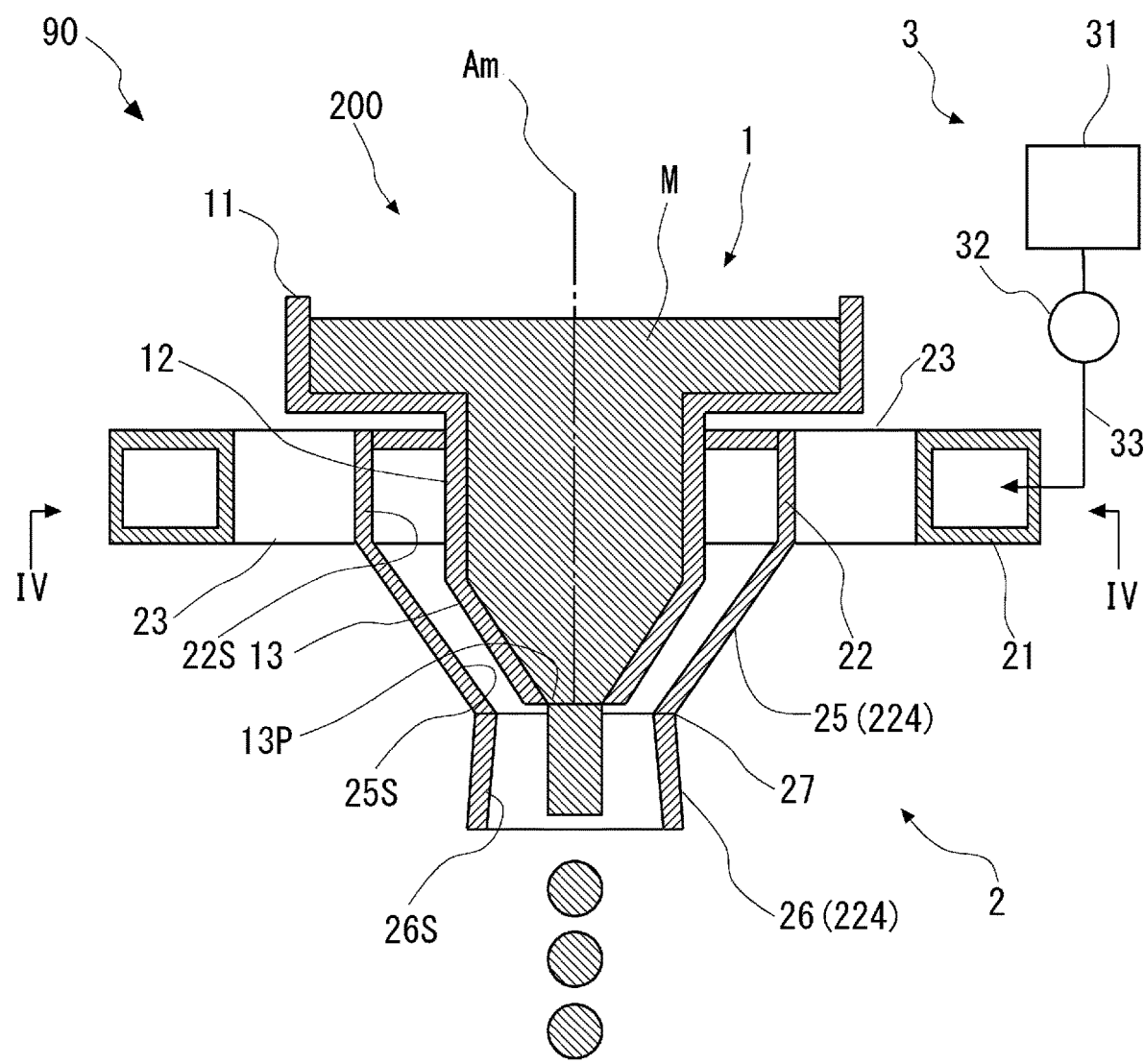
FIG. 3 is a vertical cross-sectional view of an atomizer nozzle according to a second embodiment of the present invention.

Next, a second embodiment of the present invention will be described with reference to FIGS. 3 and 4. Additionally, the same components as those in the first embodiment are designated by the same reference numerals and detailed description thereof will be omitted. In an atomizer nozzle 200 according to this embodiment, the configuration of a cover 224 is different from that of the first embodiment. As shown in FIG. 3, the cover 224 includes the diameter contraction portion 25 described in the first embodiment and a diameter expansion portion 26 connected to the lower side of the diameter contraction portion 25. The radial dimension of the diameter expansion portion 26 gradually increases from the lower end portion of the diameter contraction portion 25 toward a lower end portion of the diameter expansion portion 26. Accordingly, the diameter of the inner peripheral surface (diameter expansion surface 26S) of the diameter expansion portion 26 increases toward the lower end portion of the diameter expansion portion 26.

The position in the vertical direction (the direction of the axis Am) of the connection portion (the throat portion 27) between the diameter contraction portion 25 and the diameter expansion portion 26 is set as below. When the opening diameter of the throat portion 27 is D, the position in the vertical direction of the throat portion 27 is set to a range from 10% of D in the upward direction to 30% of D in the downward direction based on the molten metal discharge port 13P of the molten metal nozzle 1. More preferably, the position of the throat portion 27 is set to a range from 0% of D in the upward direction to 10% of D in the downward direction.

Figure 4:
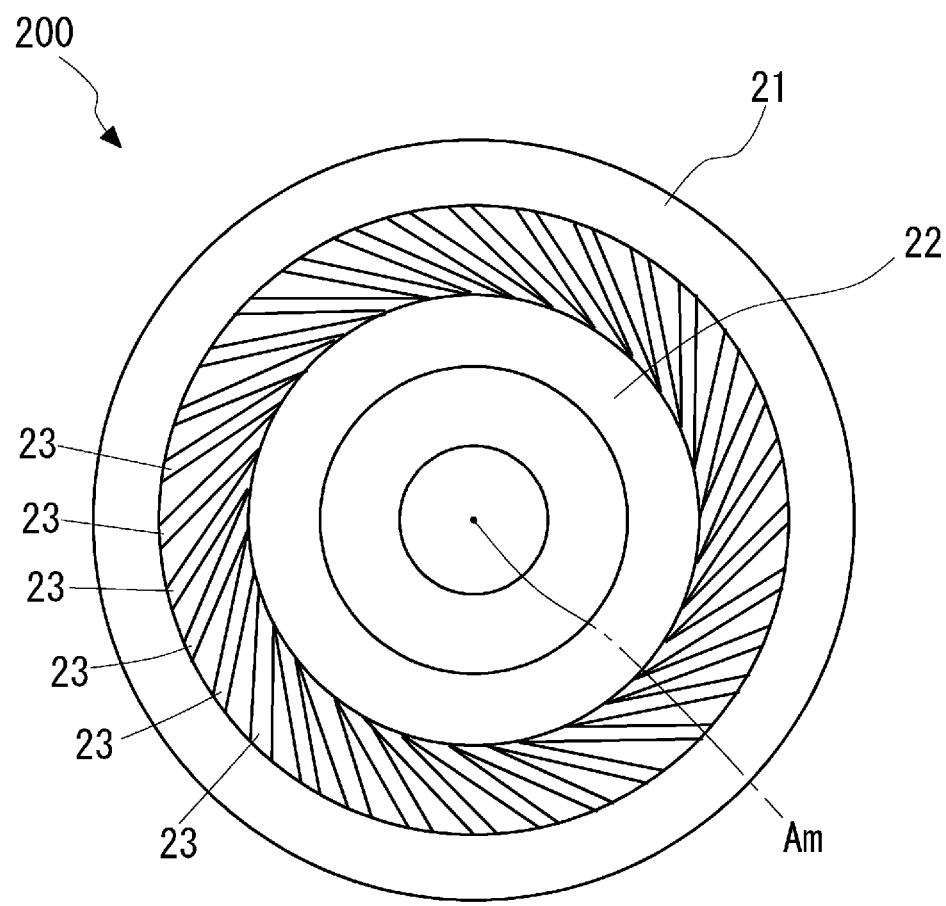
FIG. 4 is a cross-sectional view taken along a line IV-IV of FIG. 3.

Further, in this embodiment, as shown in FIG. 4, it is preferable to increase the number of the blow portions 23 compared to a case without the diameter expansion portion 26 (that is, a configuration of the first embodiment). Specifically, it is preferable to provide the blow portion 23 at five or more positions or in the entire circumference without intervals. That is, it is preferable to continuously arrange the plurality of blow portions 23 over the entire area in the circumferential direction to be adjacent to each other in the circumferential direction. Additionally, in the example of FIG. 4, an example is shown in which the plurality of blow portions 23 are provided over the entire area in the circumferential direction to be adjacent to each other in the circumferential direction and are connected to the chamber 22 over the entire area in the circumferential direction. Further, in the example of the same drawing, the plurality of blow portions 23 are arranged axially symmetrically with the axis Am as the center.

According to the above-described configuration, the cover 224 further includes the diameter expansion portion 26 to form a de Laval nozzle extending from above to below. Accordingly, the gas having reached the speed of sound when flowing along the tapered inner peripheral surface 25S passes through the inner peripheral surface (the diameter expansion surface 26S) of the diameter expansion portion 26 and becomes much faster. As a result, a larger shearing force can be given to the molten metal M. In addition, since the downward speed component (the component in the direction of the axis Am) also increases as the gas flow speeds up, the effect of blowing the metal powder downward is increased. Accordingly, it is possible to prevent the metal powder from adhering to the tapered inner peripheral surface or the diameter expansion surface. Thus, it is possible to reduce the possibility that the molten metal nozzle 1 is blocked and improve the recovery rate of the produced metal powder.

The second embodiment of the present invention has been described above. Additionally, various changes and modifications can be made to the above configuration as long as the gist of the present invention is not deviated.

Third Embodiment

Figure 5:
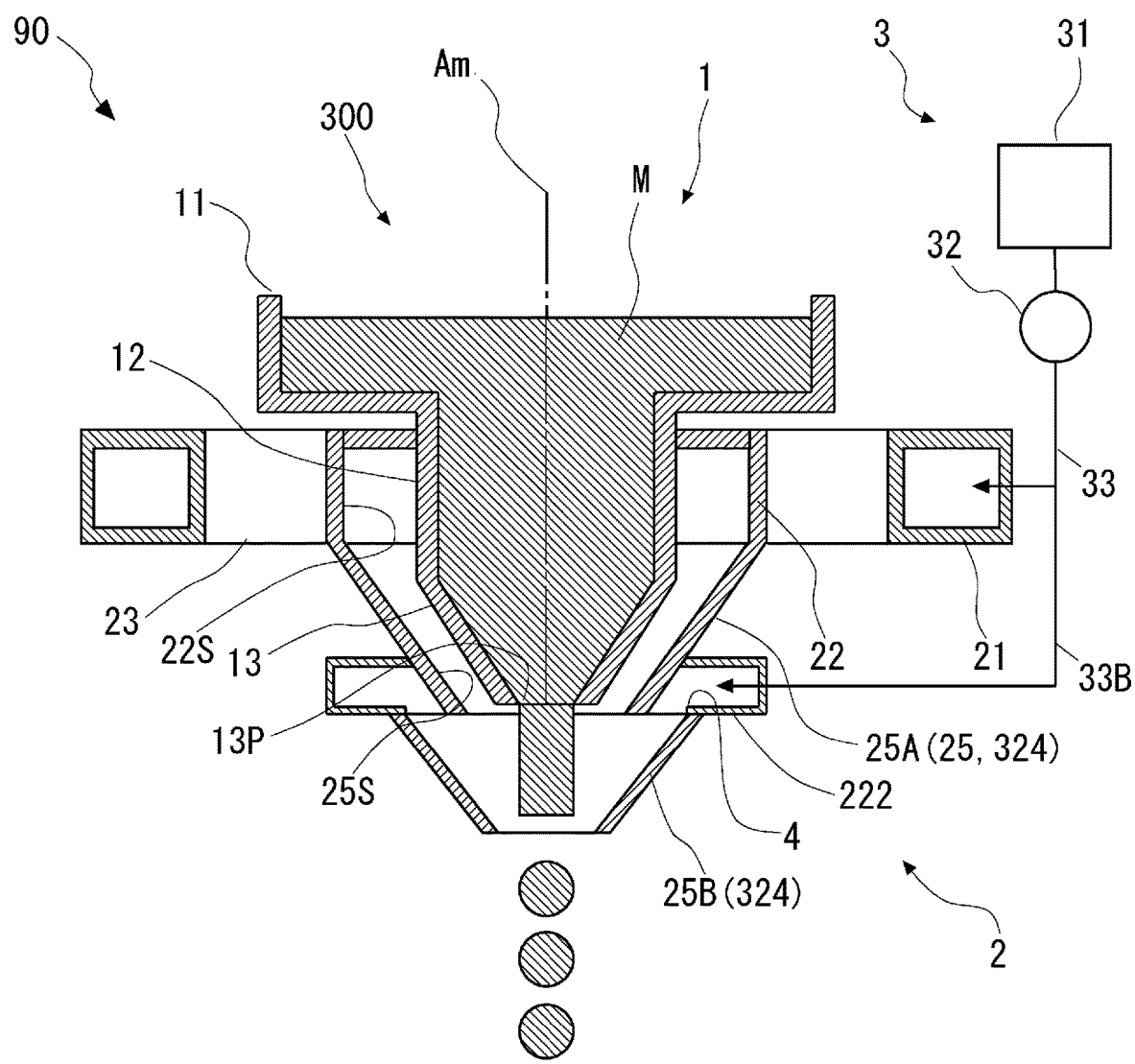
FIG. 5 is a vertical cross-sectional view of an atomizer nozzle according to a third embodiment of the present invention.

Next, a third embodiment of the present invention will be described with reference to FIG. 5. Additionally, the same components as those in the above embodiments are designated by the same reference numerals and detailed description thereof will be omitted. In an atomizer nozzle 300 according to this embodiment, the configuration of a cover 324 is different from those of the above-described embodiments. The cover 324 includes the diameter contraction portion 25 (referred to as a first diameter contraction portion 25A) described in the first embodiment, a second diameter contraction portion 25B provided below the first diameter contraction portion 25A, an axial gas blow portion 4, and a second chamber 222.

An upper end portion of the second diameter contraction portion 25B and a lower end portion of the first diameter contraction portion 25A are located at the same positions in the direction of the axis Am. The lower end portion of the first diameter contraction portion 25A is located slightly below the molten metal discharge port 13P. Further, the upper end portion of the second diameter contraction portion 25B has a larger radial dimension than lower end portion of the tapered inner peripheral surface 25S. Accordingly, an opening which spreads in the radial direction with respect to the axis Am is formed between the upper end portion of the second diameter contraction portion 25S and the lower end portion of the tapered inner peripheral surface 25S. This opening is the axial gas blow portion 4. Above the axial gas blow portion 4, the second chamber 222 having an annular shape is disposed to surround an outer periphery of the first diameter contraction portion 25A. A second supply pipe 33B which introduces a gas from the gas supply source 31 is connected to the second chamber 222.

According to the above-described configuration, the gas flow including a downward component can be introduced into the second diameter contraction portion 25B by the axial gas blow portion 4. Here, the gas flow including a swirling flow component having reached downward through the tapered inner peripheral surface 25S tends to spread to the outer peripheral side due to the centrifugal force. However, in the above-described configuration, the gas flow including the swirling flow is suppressed from the outer peripheral side by the gas introduced from the axial gas blow portion 4. As a result, the diffusion of the swirling flow is suppressed and the shearing force due to the gas can be further increased. Furthermore, since the downward speed component also increases as the gas flow speeds up, the effect of blowing the metal powder downward is increased. Accordingly, it is possible to prevent the metal powder from adhering to the tapered inner peripheral surface or the diameter expansion surface. Thus, it is possible to reduce the possibility that the molten metal nozzle 1 is blocked and improve the recovery rate of the produced metal powder.

Further, according to the above-described configuration, since the opening (the axial gas blow port) is formed between the upper end portion of the second diameter contraction portion 25S and the lower end portion of the tapered inner peripheral surface 25S, it is possible to form a downward gas flow over the entire area in the circumferential direction. As a result, it is possible to uniformly suppress the gas flow including the swirling flow from the outer peripheral side by the gas introduced from the axial gas blow portion 4. Accordingly, a uniform shearing force is given to the molten metal M in the circumferential direction and the metal powder can be stably produced.

As described above, embodiments of the present invention have been described. Additionally, various changes and modifications can be made to the above configuration as long as the gist of the present invention is not deviated.

Further, in the blow portion 23, as shown in FIG. 6, the second end portion 23B may be located below the first end portion 23A. That is, the blow portion 23 extending from the first end portion 23A to the second end portion 23B may be obliquely arranged from above downward. In the latter case, the component in the direction of the axis Am can be given to the gas flow. Further, even when the blow portion 23 itself extends in the horizontal plane, it is possible to adopt a configuration in which a gas is introduced from diagonally above toward below with respect to the chamber 22. Also in this case, the component in the direction of the axis Am can be given to the gas flow.

INDUSTRIAL APPLICABILITY

The present invention is applicable to an atomizing device, a method for producing a metal powder, and metal powder.

REFERENCE SIGNS LIST

1: Molten metal nozzle
2: Gas nozzle
3: Gas supply unit
4: Axial gas blow portion
11: Molten metal storage portion
12: Cylindrical portion
13: Tip portion
21: Annular portion
22: Chamber
23: Blow portion
24, 224, 324: Cover
25: Diameter contraction portion
26: Diameter expansion portion
27: Throat portion
31: Gas supply source
32: Compressor
33: Supply pipe
100, 200, 300: Atomizer nozzle
222: Second chamber
13P: Molten metal discharge port
22S: Chamber inner peripheral surface
23A: First end portion
23B: Second end portion
25A: First diameter contraction portion
25B: Second diameter contraction portion
25P: Gas discharge port
25S: Tapered inner peripheral surface
26S: Diameter expansion surface
33B: Second supply pipe
Am: Axis
M: Molten metal
S1: Molten metal flow step
S2: Gas blow step
S3: Atomization step

What is claimed is:
1. An atomizer nozzle comprising:
a molten metal nozzle extending in a vertical direction and which is configured to allow a molten metal to flow downward from a lower end of the molten metal nozzle; and
a gas nozzle including a chamber having an inner peripheral surface surrounding an outer periphery of the molten metal nozzle, a blow portion which is configured to introduce a gas to the chamber toward a circumferential direction of the molten metal nozzle, and a cover extending from the chamber to a position below the lower end of the molten metal nozzle while surrounding the molten metal nozzle, wherein the cover is provided with a tapered inner peripheral surface which is connected to the inner peripheral surface of the chamber and has a diameter which decreases toward a lower end portion of the tapered inner peripheral surface,
wherein the cover is further provided with a diameter expansion surface which is connected to the lower end portion of the tapered inner peripheral surface and has a diameter which increases toward a lower end portion of the diameter expansion surface.

2. The atomizer nozzle according to claim 1, wherein the blow portion is formed so as to introduce the gas obliquely downward to the chamber.

3. The atomizer nozzle according to claim 1, wherein the tapered inner peripheral surface is a first diameter contraction portion, wherein the cover is further provided with a second diameter contraction portion which is installed below the tapered inner peripheral surface and has a diameter which decreases toward a lower end portion of the second diameter contraction portion, and an axial gas blow portion which is configured to introduce a gas flow including a downward component to an inside of the second diameter contraction portion.

4. The atomizer nozzle according to claim 3, wherein an upper end portion of the second diameter contraction portion has a larger radial dimension than that of the lower end portion of the tapered inner peripheral surface, and an opening as the axial gas blow portion is formed between the upper end portion of the second diameter contraction portion and the lower end portion of the tapered inner peripheral surface.

5. The atomizer nozzle according to claim 1, wherein the chamber is formed in an annular shape of which a central axis is aligned in the vertical direction.

6. The atomizer nozzle according to claim 5, wherein the blow portion is connected to the chamber so as to be extended in a tangential direction of the chamber.

7. The atomizer nozzle according to claim 1, wherein the cover includes a plurality of the blow portions arranged at intervals in the circumferential direction.

8. An atomizing device comprising:
the atomizer nozzle according to claim 1.

9. A method for producing a metal powder using an atomizer nozzle, the method comprising:
allowing a molten metal to flow downward from a lower end of a molten metal nozzle of the atomizer nozzle extending in a vertical direction;
introducing a gas into a gas nozzle of the atomizer nozzle including a chamber having an inner peripheral surface surrounding an outer periphery of e molten metal nozzle from a blow portion introducing the s toward a circumferential direction of the molten metal nozzle; and
applying a swirling flow to the introduced gas by a cover, the cover extending from the chamber to a position below the lower end of the molten metal nozzle while surrounding the molten metal nozzle, the cover being provided with a tapered inner peripheral surface connected to the inner peripheral surface of the chamber and having a diameter which decreases toward a lower end portion of the tapered inner peripheral surface, such that the gas is brought into contact with the molten metal to atomize the molten metal,
wherein the cover is further provided with a diameter expansion surface which is connected to the lower end portion of the tapered inner peripheral surface and has a diameter which increases toward a lower end portion of the diameter expansion surface.

* * * * *